United States Patent
Lee

(10) Patent No.: US 8,106,925 B2
(45) Date of Patent: Jan. 31, 2012

(54) SYSTEM TO COMPOSE PICTORIAL/VIDEO IMAGE CONTENTS WITH A FACE IMAGE DESIGNATED BY THE USER

(75) Inventor: Chang Hwan Lee, Seoul (KR)

(73) Assignee: FXGear, Inc., Seoul (KR)

( * ) Notice: Subject to any disclaimer, the term of this patent is extended or adjusted under 35 U.S.C. 154(b) by 0 days.

(21) Appl. No.: 12/093,907

(22) PCT Filed: Jul. 19, 2007

(86) PCT No.: PCT/KR2007/003496
§ 371 (c)(1),
(2), (4) Date: Jan. 12, 2010

(87) PCT Pub. No.: WO2008/126964
PCT Pub. Date: Oct. 23, 2008

(65) Prior Publication Data
US 2010/0141679 A1    Jun. 10, 2010

(30) Foreign Application Priority Data
Apr. 16, 2007    (KR) .......................... 10-2007-0037047

(51) Int. Cl.
G09G 5/00     (2006.01)
G06T 13/00    (2011.01)

(52) U.S. Cl. ........ 345/634; 345/629; 345/473; 345/475; 345/646; 345/647

(58) Field of Classification Search ................. 345/629, 345/634, 473, 475; 725/32; 386/286; 348/584, 348/586
See application file for complete search history.

(56) References Cited

U.S. PATENT DOCUMENTS

| 5,611,037 A | 3/1997 | Hayashi |
| 2002/0087329 A1* | 7/2002 | Massaro et al. ............... 704/275 |
| 2008/0039163 A1* | 2/2008 | Eronen et al. .................... 463/1 |
| 2009/0144173 A1* | 6/2009 | Mo et al. ....................... 705/27 |

FOREIGN PATENT DOCUMENTS

| KR | 1020010090308 | 10/2001 |
| KR | 1020020067088 | 8/2002 |
| KR | 1020060115700 | 11/2006 |

* cited by examiner

Primary Examiner — Chante Harrison
(74) Attorney, Agent, or Firm — NSIP Law

(57) ABSTRACT

A system for composing pictorial/video image contents where the Face Image which the User designates (FIU) is reflected is disclosed. The system provides a series of pictorial/video image composing pipe line for changing the face of a specific source character that appears in pictorial/video image contents to a FIU pattern and guides a video related company (for example, a producer, a distributor, a sales agency (provider), etc.) to establish a base infra for producing/manufacturing/marketing a video on demand (VOD) content that reflects individual desire of a user so that it can satisfy user needs in changing the face image of a specific character appearing in pictorial/video image contents into the face image of a favorite person (or the user designates, for example, his/her own face image, the face image of his/her acquaintance, the face image of a specific celebrity, the face image of a specific politician, and so on).

5 Claims, 13 Drawing Sheets

[Figure 1]
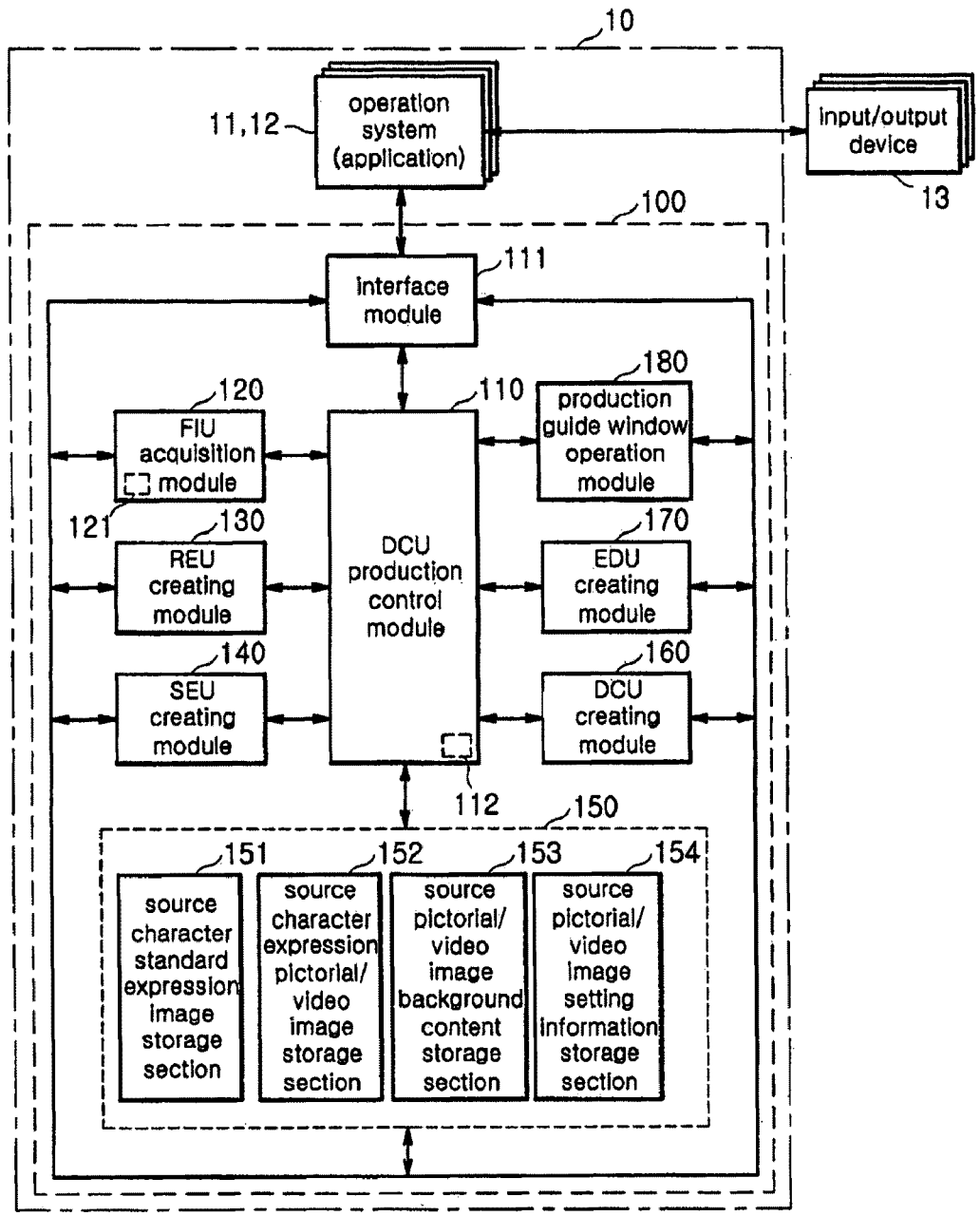

[Figure 2]
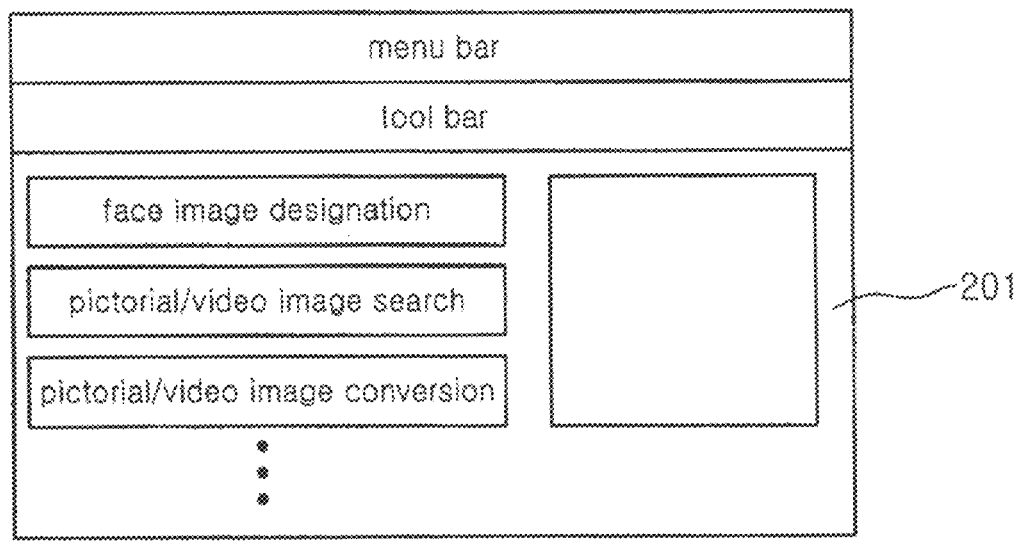
[Figure 3]
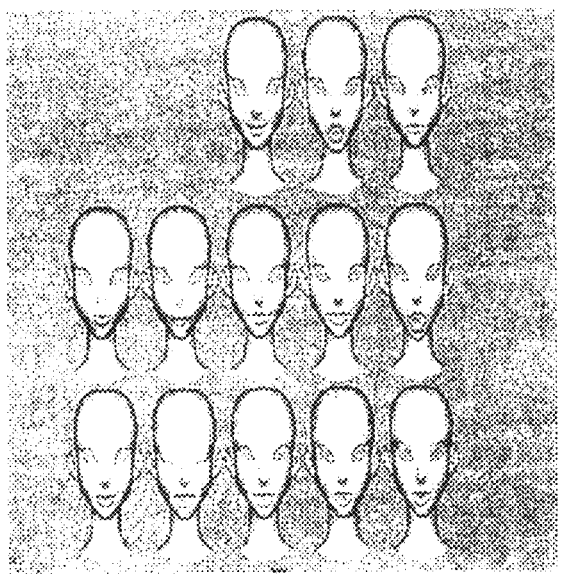

[Figure 4]
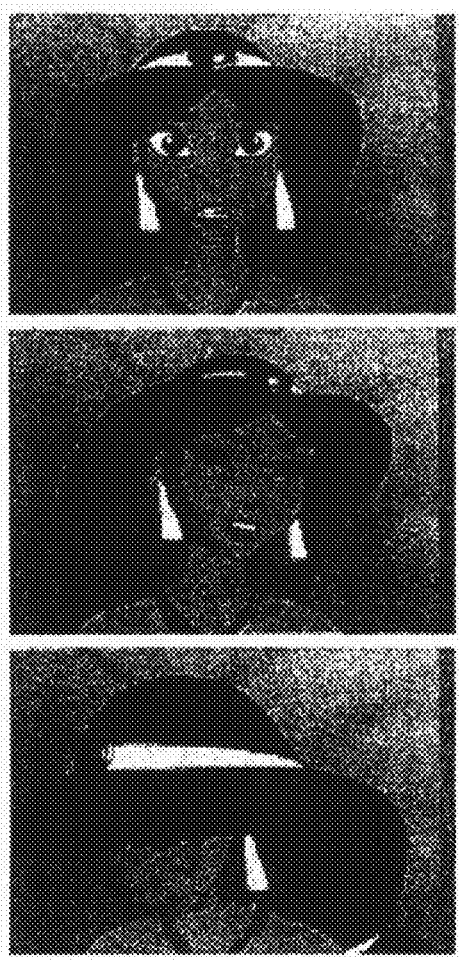
[Figure 5]
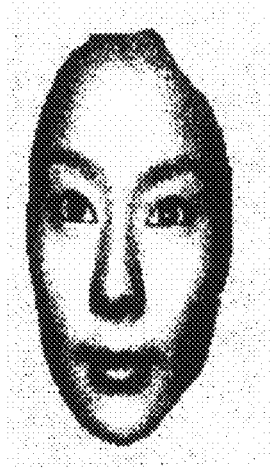

[Figure 6]
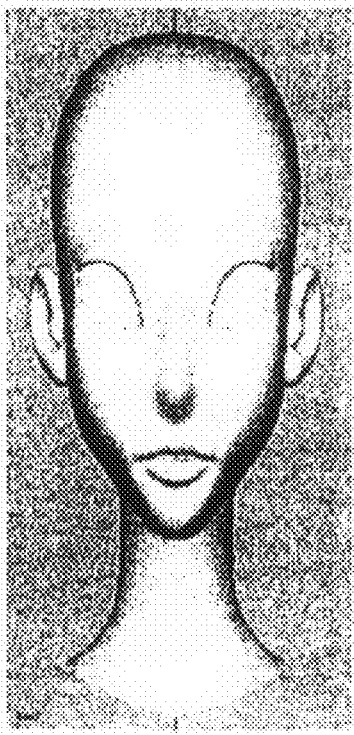
[Figure 7]
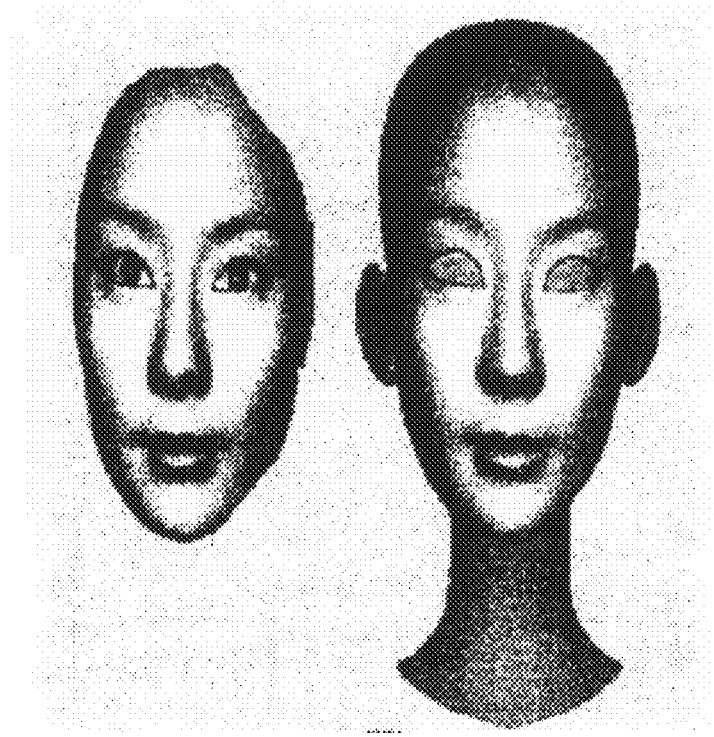

[Figure 8]
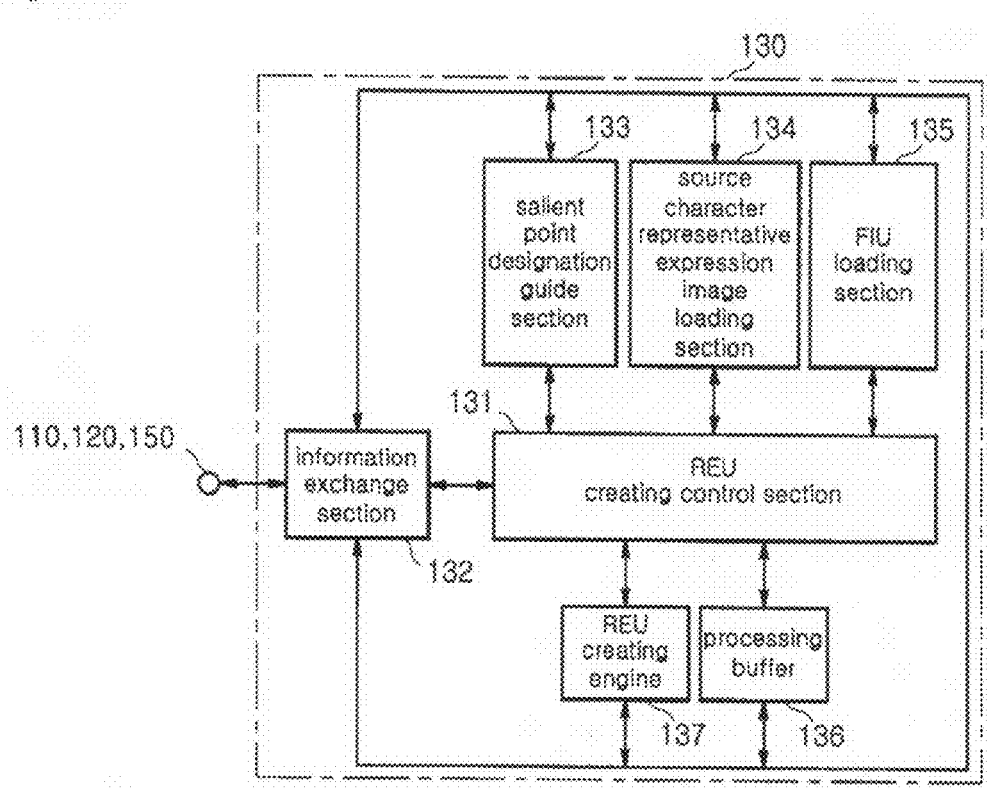
[Figure 9]
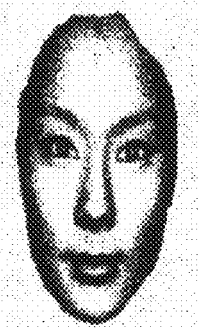

[Figure 10]
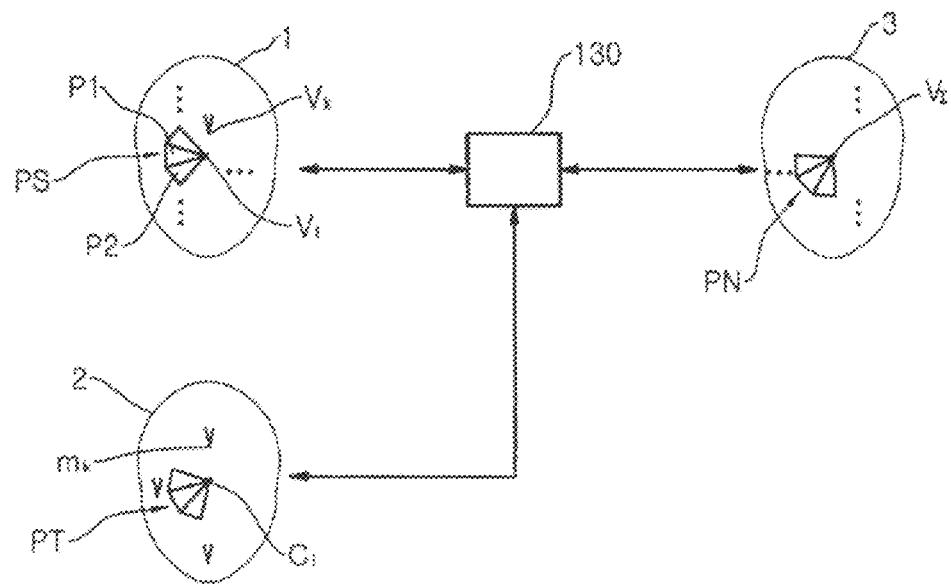
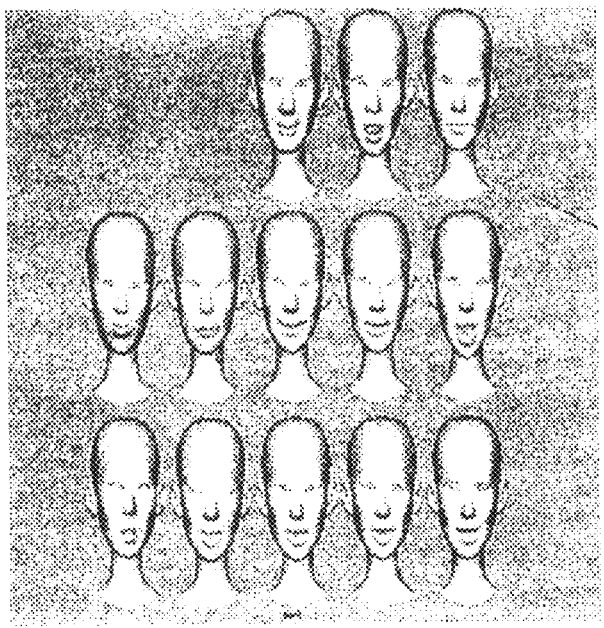
[Figure 11]

[Figure 12]
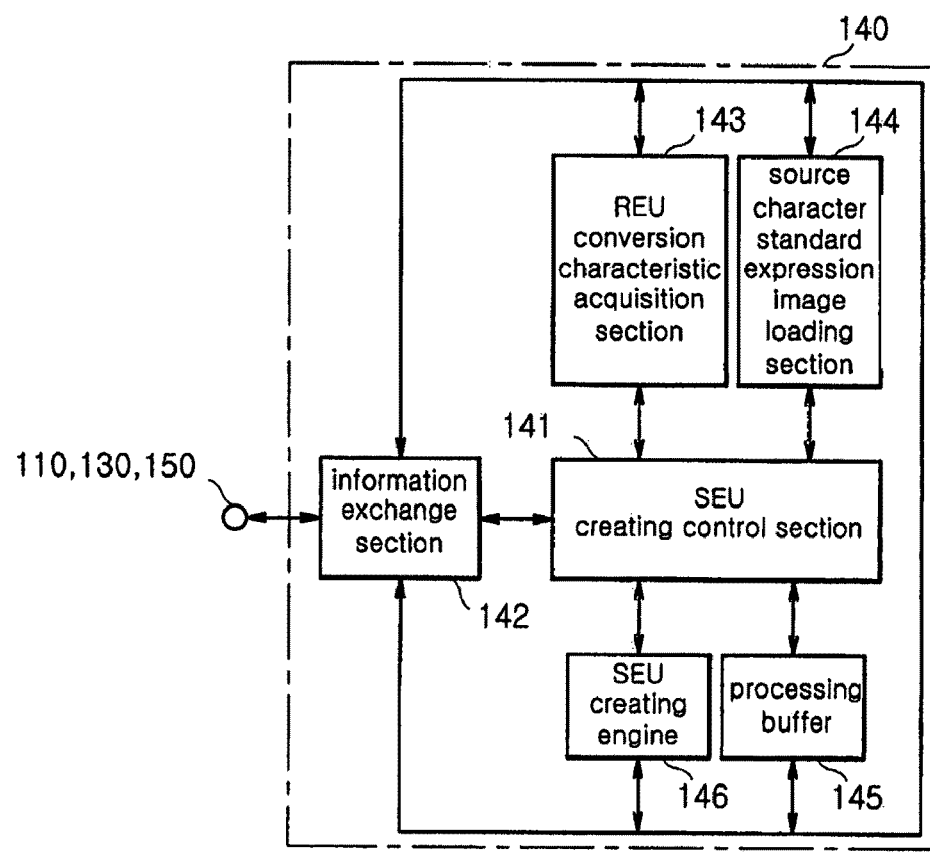

[Figure 13]
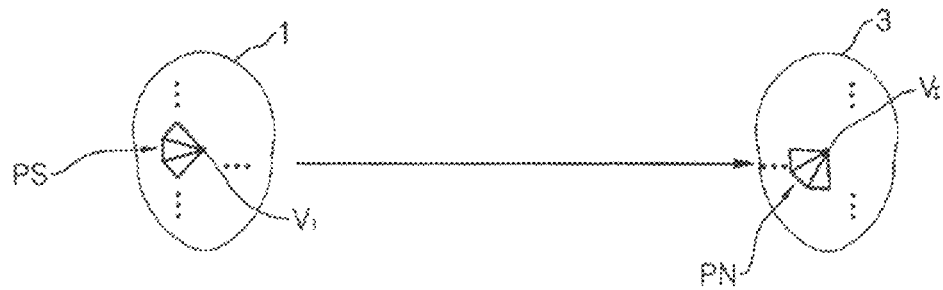
[Figure 14]

[Figure 15]
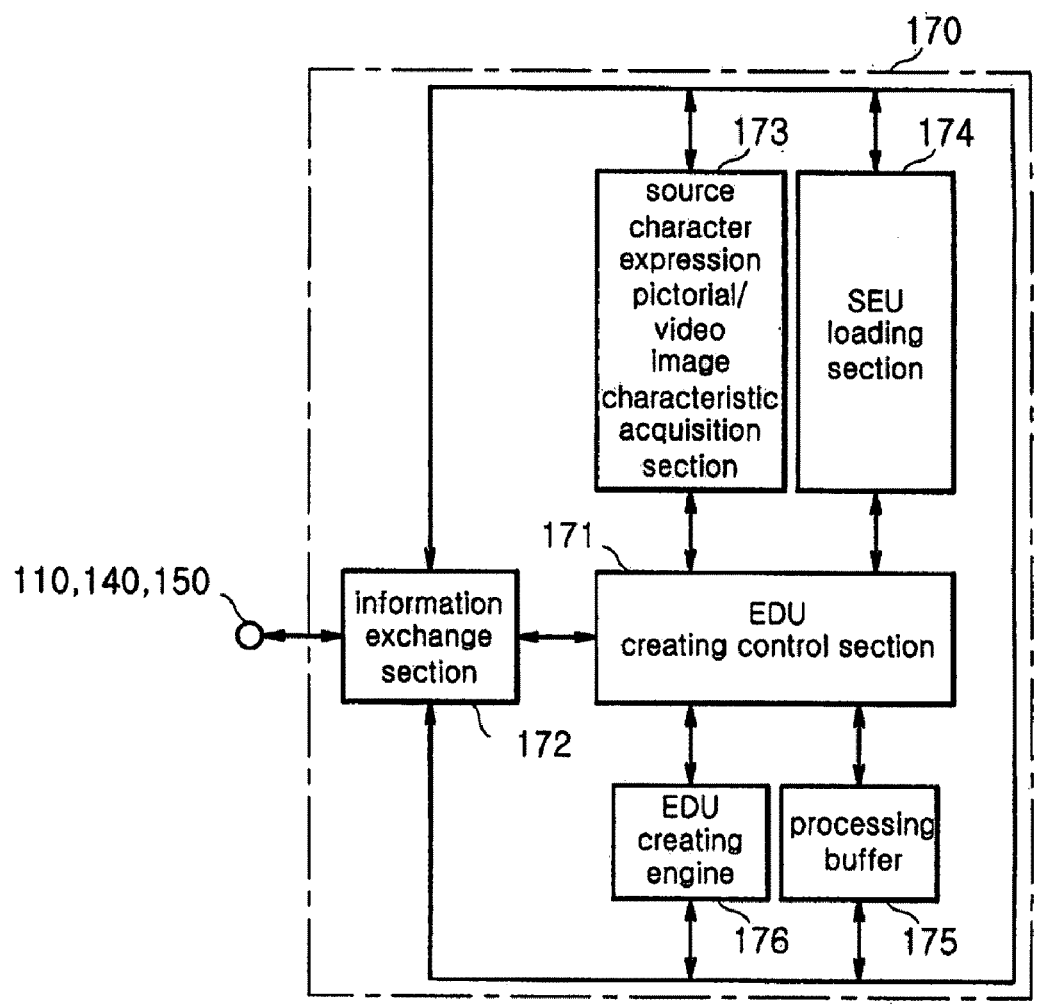

[Figure 16]
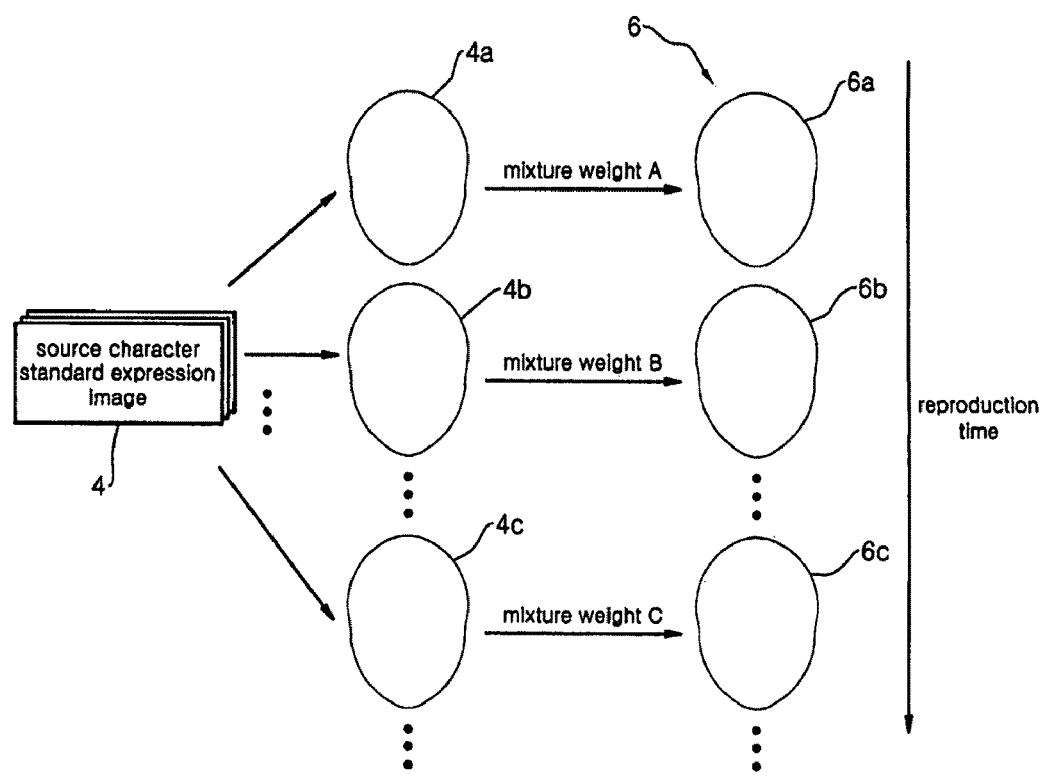

[Figure 17]
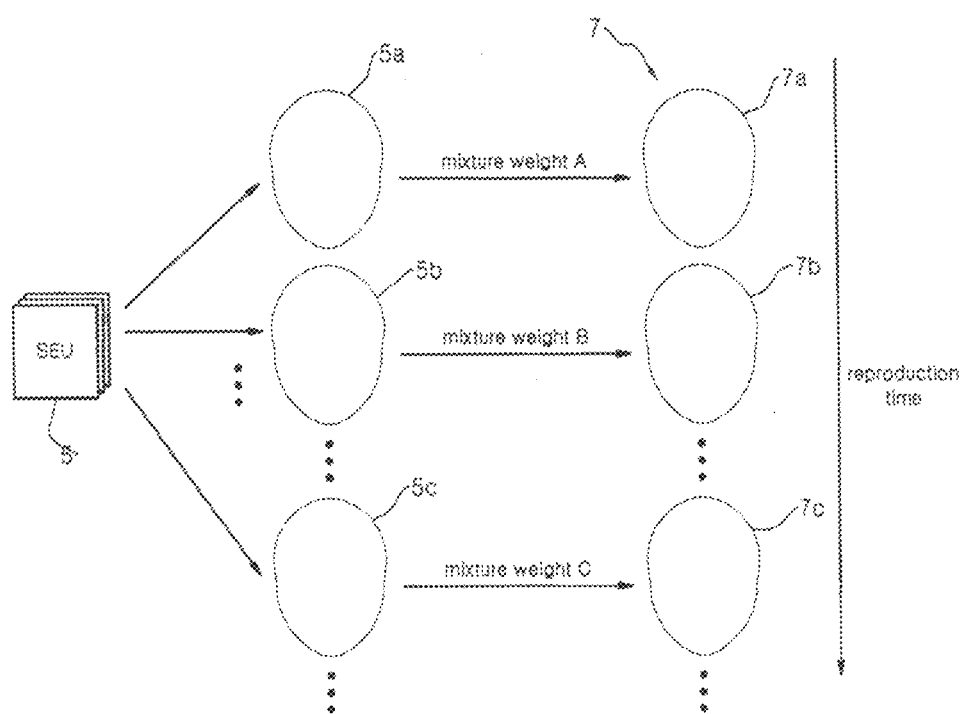
[Figure 18]

[Figure 19]
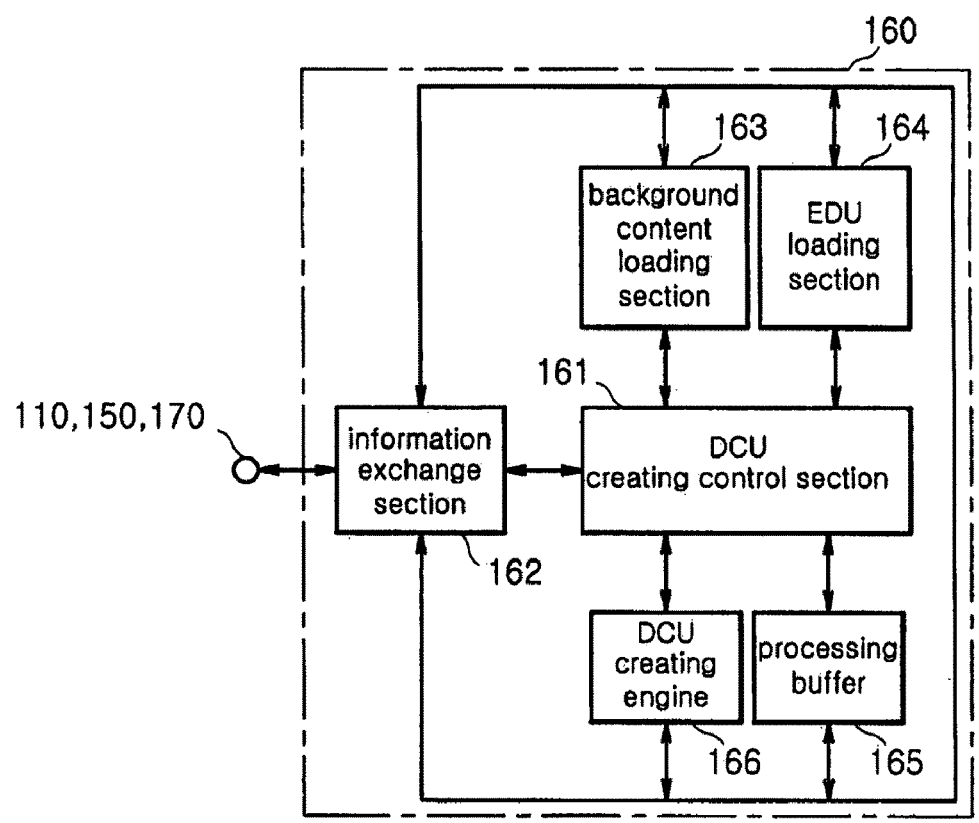

[Figure 20]
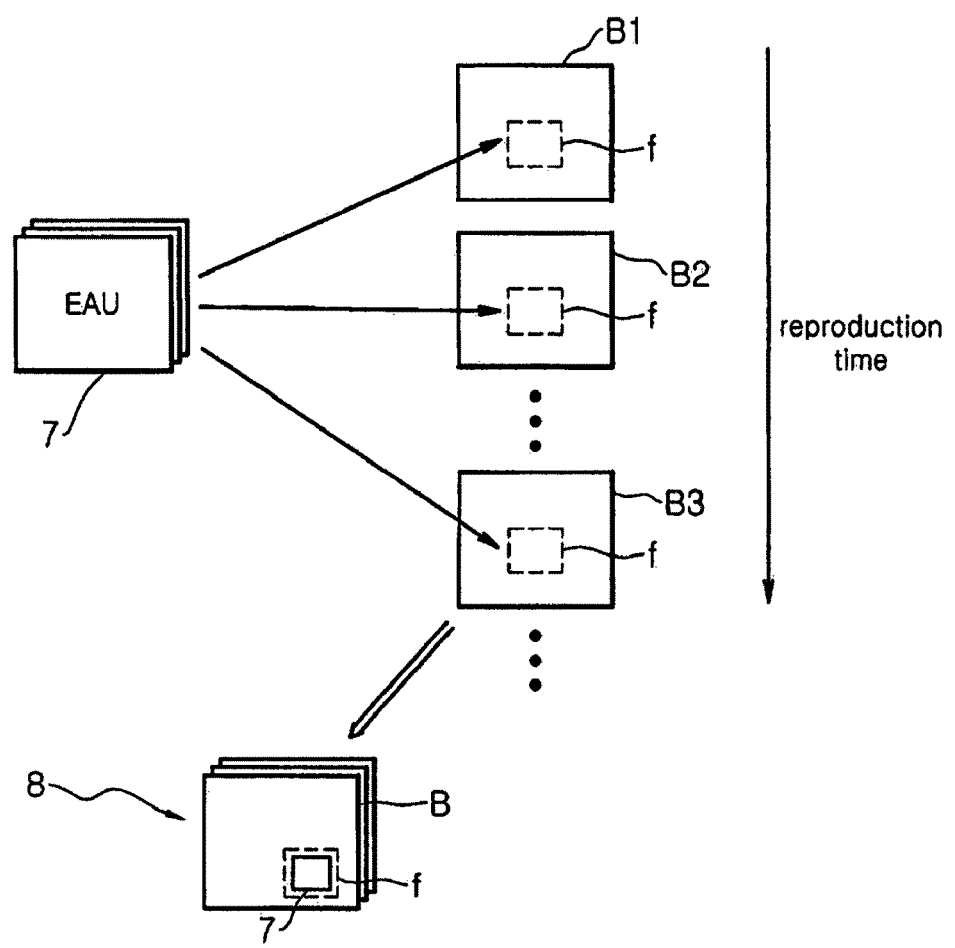

SYSTEM TO COMPOSE PICTORIAL/VIDEO IMAGE CONTENTS WITH A FACE IMAGE DESIGNATED BY THE USER

TECHNICAL FIELD

The present invention relates to a system for composing pictorial/video image contents where the Face Image which the User designates (hereinafter referred to as "FIU") is reflected, and more particularly, to a system for composing pictorial/video image contents reflecting the FIU, in which the system provides a series of pictorial/video image composing pipe line capable of changing the face of a specific source character that appears in pictorial/video image contents to a FIU pattern and guides a video related company (for example, a producer, a distributor, a sales agency (provider), etc.) to be able to establish a base infra for producing/manufacturing/marketing a video on demand (VOD) content that reflects individual desire of a user so that it can satisfy user needs in changing the face image of a specific character appearing in pictorial/video image contents into the face image of his/her favorite person (or the user designates, for example, his/her own face image, the face image of his/her acquaintance, the face image of a specific celebrity, the face image of a specific politician, and so on).

BACKGROUND ART

With widespread home appliances including DVD players, CD players, video players, and so on in recent years, the number of users who purchase/watch pictorial/video image contents (e.g., music videos, movies, games, animations, etc.) has also increased to a great extent. Keeping abreast with such an increase in users, a variety of video content products like DVDs, CDs, videos and so on have come out and their scale has sharply increased ever.

Under a traditional system, pictorial/video image contents related companies usually produced the contents and put them on the market en bloc, without paying special attentions on the needs of individual users. Therefore, it was rather a matter of course to see that same character appearing in each video content that was released (sold) to the public always had the same face images that were originally designed by producers.

For instance, suppose that 1,000 products of a video content such as <Aladdin> were sold to the public. A character 'Genie' in the content has the same face image that a producer originally designed in each of the 1,000 products. Similarly, suppose that 1,000 products of a video content such as <The story of Heung-bu> (a Korean classic novel) were sold to the public. A character 'Heung-bu' in the content has the same face image that a producer originally designed in each of the 1,000 products.

In case that the same characters appearing in each video content released (sold) to the public have the same face images that a producer has originally designed, users had no choice but accepting them as they are. For example, although a user may desire to adopt a special order to change the face image of a specific character appearing in a video content into the face image of his/her favorite person (or the user designates, for example, his/her own face image, the face image of his/her acquaintance, the face image of a specific celebrity, the face image of a specific politician, and so on), it could not be realized at all.

SUMMARY

The invention has been made to solve the above problems occurring in the prior art. An object of the invention is to provide a system for composing pictorial/video image contents where the Face Image which the User designates (hereinafter referred to as "FIU") is reflected. The object of the invention is achieved through a computational module that converts a representative expression image of a source character appearing in a video content to a FIU where a user's preferences are reflected to generate a Representative Expression image for User design character (hereinafter referred to as "REU"), a computational module that converts a standard expression image of a source character on the basis of a specific relationship between REU and the representative expression image of the source character to create plural Standard Expression images for User design character (hereinafter referred to as "SEU"), a computational module that combines and transforms SEU in an appropriate manner on the basis of generation characteristics of an expression pictorial/video image of the source character to create an Expression pictorial/viDeo image for User design character (hereinafter referred to as "EDU"), and a computational module that combines EDU with the background of a source image (character face layer, background layer, costume layer, etc.) to create a pictorial/viDeo image Contents where the face image which the User designates is reflected (hereinafter referred to as "DCU") having the face image of a character appeared on an image being newly replaced in FIU pattern. These computational modules provide a series of video composing pipe line capable of changing the face of a specific source character that appears in pictorial/video image contents to a FIU pattern and guides a video related company (for example, a producer, a distributor, a sales agency (provider), etc.) to be able to establish a base infra for producing/manufacturing/marketing a video on demand (VOD) content that reflects individual desire of a user so that they can satisfy user needs in changing the face image of a specific character appearing in pictorial/video image contents into the face image of his/her favorite person (or the user designates, for example, his/her own face image, the face image of his/her acquaintance, the face image of a specific celebrity, the face image of a specific politician, and so on).

To achieve the foregoing object, there is provided a system for composing a pictorial/video image content where FIU (face image which the user designates) is reflected, comprising: a DCU (pictorial/viDeo image Contents where the FIU is reflected) production control module installed in an information processing device having an operation system for storing and managing information related to a source pictorial/video image content, for outputting and operating a production guide window, and for performing an overall control over changing a face of a specific source character appearing in the source pictorial/video image content to an FIU pattern; an REU creating module for converting, under the control of the DCU production control module, a representative expression image of a specific source character appearing in the source pictorial/video image content into one matching with the FIU, to create an REU (Representative Expression image for User design character); an SEU creating module for converting, under the control of the DCU production control module, standard expression images of the source character based on conversion features between a representative expression image of the source character and the REU, to create plural SEUs (Standard Expression images for User design character); an EDU creating module for selectively combining and transforming the SEUs, under the DCU production control module, based on conversion features exhibiting when a proximate expression image that is most proximate to each reproduced expression pictorial/video image of the source character among standard expression images of the source character is converted into each reproduced expression image, to create an EDU (Expression pictorial/viDeo image for User design character); and a DCU creating module for creating, under the control of the DCU production control module, a DCU having a face image of the source character being newly replaced into the FIU pattern by combining the EDU with a background of the source pictorial/video image content.

The invention is realized through a computational module that converts a representative expression image of a source character appearing in a video content to a FIU where a user's preferences are reflected to generate a REU, a computational module that converts a standard expression image of a source character on the basis of a specific relationship between REU and SEUs to create plural SEUs, a computational module that combines and transforms SEU in an appropriate manner on the basis of generation characteristics of an expression pictorial/video image of the source character to create an EDU, and a computational module that combines EDU with the background of a source image (character face layer, background layer, costume layer, etc.) to create a DCU having the face image of a character appeared on an image being newly replaced in FIU pattern. These computational modules provide a series of video composing pipe line capable of changing the face of a specific source character that appears in pictorial/video image contents to a FIU pattern and guides a video related company (for example, a producer, a distributor, a sales agency (provider), etc.) to be able to establish a base infra for producing/manufacturing/marketing a video on demand (VOD) content that reflects individual desire of a user so that they can satisfy user needs in changing the face image of a specific character appearing in pictorial/video image contents into the face image of his/her favorite person (or the user designates, for example, his/her own face image, the face image of his/her acquaintance, the face image of a specific celebrity, the face image of a specific politician, and so on).

DESCRIPTION OF DRAWINGS

The above and other objects, features and advantages of the present invention will be more apparent from the following detailed description taken in conjunction with the accompanying drawings, in which:

FIG. 1 conceptually shows a general structure of a DCU production system according to an embodiment of the invention;

FIG. 2 conceptually shows a noticed state of a production guide window according to an embodiment of the invention;

FIG. 3 conceptually shows a saved state of source character standard face images according to an embodiment of the invention;

FIG. 4 conceptually shows a saved state of an expression pictorial/video image of a source character according to an embodiment of the invention;

FIG. 5 conceptually shows an FIU according to an embodiment of the invention;

FIG. 6 conceptually shows a representative expression image of a source character according to an embodiment of the invention;

FIG. 7 conceptually shows an REU according to an embodiment of the invention;

FIG. 8 conceptually shows a detailed structure of an REU creating module according to an embodiment of the invention;

FIG. 9 conceptually shows a performance result of a salient point designation guide section that belongs to an REU creating module according to an embodiment of the invention;

FIG. 10 conceptually shows a performance of an REU creating engine that belongs to a REU creating module according to an embodiment of the invention;

FIG. 11 conceptually shows an SEU according to an embodiment of the invention;

FIG. 12 conceptually shows a detailed structure of an SEU creating module according to an embodiment of the invention;

FIG. 13 conceptually shows a performance of an SEU creating engine that belongs to an SEU creating module according to an embodiment of the invention;

FIG. 14 conceptually shows an EDU according to an embodiment of the invention;

FIG. 15 conceptually shows a detailed structure of an EDU creating module according to an embodiment of the invention;

FIG. 16 and FIG. 17 conceptually show a performance of an EDU creating engine that belongs to an EDU creating module according to an embodiment of the invention;

FIG. 18 conceptually shows a DCU according to an embodiment of the invention;

FIG. 19 conceptually shows a detailed structure of a DCU creating module according to an embodiment of the invention; and FIG. 20 conceptually shows a performance of a DCU creating engine that belongs to a DCU creating module according to an embodiment of the invention.

DETAILED DESCRIPTION

Hereinafter, a preferred embodiment of a system for composing pictorial/video image contents where FIU is reflected of the present invention will be described with reference to the accompanying drawings.

As shown in FIG. 1, a system 100 for composing pictorial/video image contents where FIU is reflected according to an embodiment of the invention is attached to an information processing apparatus 10 such as a notebook computer, a desktop computer, etc.

In such circumstances, a video related company (e.g., a producer, a distributor, a selling agency (provider), etc.) executes the pictorial/video image contents composing system of the invention through the medium of an input/output device 13 (e.g., a mouse, a keyboard, a monitor, etc.), an operation system 11, an application 12 and so on to produce and further manufacture/sell a video on demand (VOD) content to meet the needs of individual users, through which the face image of a specific character (Genie, Snow-White, Heung-bu, Sinbad, etc.) appearing in pictorial/video image contents can be changed to the face image of another person who a user ordered (for example, his/her own face image, the face image of his/her acquaintance, the face image of a specific celebrity, the face image of a specific politician, and so on).

At this time, as can be seen from the drawing, the system 100 for composing pictorial/video image contents where FIU is reflected according to an embodiment of the invention is largely constituted by a DCU production control module 110, a production guide window operation module 180 controlled by the DCU production control module 110 overall, a FIU acquisition module 120, a source image content related information storage module 150, an REU creating module 130, an SEU creating module 140, an EDU creating module 170, and a DCU creating module 160, each being closely combined with one another.

In this case, the DCU production control module 110 maintains close connection with the operating system 11, application 12, and etc. on the side of the information processing apparatus 10 by the medium of the interface module 111, overally controls/manages the process of changing the face of a specific character (e.g. Genie, Snow-White, Heung-bu, Sinbad, etc.) appearing in pictorial/video image contents (e.g. Alladin, Snow-White, The story of Heung-bu, The adventure of Sinbad) to a FIU pattern in accordance with the work of a video related company.

At this time, the production guide window operation module 180 flexibly extracts, under the control of the DCU production control module 110, various kinds of operating information stored in a private information storage area, e.g., image/test information, skin information, link information, setting information, etc. for generating a guide window, and generates a production guide window 201 as depicted in FIG. 2 on the basis of the various operating information having been extracted. And, the production guide window operation module 180 selects and notifies the production guide window 201 through an output device 13 on the side of the information processing apparatus 10 so that basic environment required for various service procedures can be established smoothly without particular problems by the DCU production control module 110.

The source pictorial/video image content related information storage module 150 being controlled by the DCU production control module 110 includes a source character standard expression image storage section 151, a source character expression pictorial/video image storage section 152 and the like to store and manage "various source character standard expression images as shown in FIG. 3" and "source character expression images as shown in FIG. 4" (in this case, source character standard expression images indicate standard facial expression images used as a practical basis for source character expression images, e.g., a crying face, an angry face, an astonished face, a laughing face, an image having a mouth shape in pronouncing a given phonetic symbol and so on). Moreover, the source pictorial/video image content related information storage module 150 includes a source pictorial/video image background content storage section 153 and a source pictorial/video image setting information storage section 154, so that source pictorial/video image background contents (e.g., background pictorial/video image layer, source character body pictorial/video image layer, other source character layer, source character accessories/clothes layer, etc.), and source pictorial/video image setting information (e.g., source character's representative expression image designation information, conversion characteristics information between source character's standard expression image and expression pictorial/video image, proximal expression image related information and the like) are stored and managed in a stable manner.

Under such a basic infra structure, the FIU acquisition module 120 being controlled by the DCU production control module 110 builds a series of communication relationships with the operation system 11 and the application 12 via an interface module 111, and a video related company operates the production guide window 201 to progress a computation work providing a privately designated FIU (FIU at this time is the face image of a user/celebrity/politician, etc., designated by a user who made a special order to the video related company for production of pictorial/video image contents, and the procedure of acquiring such a user designated face image may undergo diverse changes in accordance with circumstances of the video related company.) to the unit 100. In this case, the FIU acquisition module 120 acquires a FIU similar to one shown in FIG. 5 for example by the medium of the interface module 111, and then stores and manages the acquired FIU in a private information storage buffer 121.

In addition, the REU creating module 130 communicates, under the control of the DCU production control module 110, with the source character standard expression image storage section 151 and with the source pictorial/video image setting information storage section 154 after FIU is secured and stored in the information storage buffer 121 by the FIU acquisition module 120. Accordingly, the REU creating module 130 extracts a source character representative expression image similar to one shown in FIG. 6 (In this case, the source character representative expression image means an expression image of the source character that can represent standard expression images of each source character.) out of the standard expression images of the source character (refer to FIG. 3) having been stored in the source character standard expression image storage section 151 and then converts the source character representative expression image that matches with FIU, to create an REU similar to one shown in FIG. 7.

At this time, as shown in FIG. 8, the REU creating module 130 is constituted by an REU creating control section 131 that is in charge of overall control of the REU creating procedure, and other constituents that operate under the control of the REU creating control section 131, i.e., an FIU loading section 135, a source character representative expression image loading section 134, a salient point designation guide section 133, and an REU creating engine 137, each being closely combined with one another.

Here, the FIU loading section 135 communicates, under the control of the REU creating control section 131, with the FIU acquisition module 120 via an information exchange section 132 after the FIU is secured and stored (refer to FIG. 5) in the information storage buffer 121 by the FIU acquisition module 120, and loads the acquired FIU in a processing buffer 136.

Meanwhile, the source character representative expression image loading section 134 communicates, under the control of the REU creating control section 131, with the source pictorial/video image setting information storage section 154 via the information exchange section 132 after the FIU loading procedure is completed by the FIU loading section 135, to figure out source character's representative expression image designation information (e.g., information that explains about the source character's representative expression image) having been stored. Later, the source character representative expression image loading section 134 communicates with the source character standard expression image storage section 151 via the information exchange section 132, to selectively select a source character representative expression image (refer to FIG. 6) out of the standard expression images of the source character having been stored (refer to FIG. 3), and loads the extracted source character representative expression image into the processing buffer 136 (of course, the performance of the source character representative expression image loading section may precede the performance of the FIU loading section described earlier).

Furthermore, the salient point designation guide section 133 communicates, under the control of the REU creating control section 131, with the production guide window operation module 180 after extracting FIU that has been loaded into the processing buffer 136 by the FIU loading section 135, and displays the corresponding FIU through the production guide window 201 as shown in FIG. 9. In this manner, a video related company (or a user) may easily designate a number of salient points on main parts of FIU (eyes, nose, philtrum, etc.) through the production guide window 201.

Upon the completion of the procedures in respective computation parts, the REU creating engine 137 under the control the REU creating control section 131 acquires, as illustrated in FIG. 10, "a difference degree (for example, a degree indicating the difference between two positions) between a position (e.g., $m_k$) of the salient point appointed to the main part of the FIU 2 and a position (e.g., $v_k$) of vertex constituting a polygon mesh (PS) of the representative expression image 1".

In this case, the REU creating engine 137 analyzes/acquires the difference between the two positions under limited condition as shown in Math FIG. 1 below, i.e., limited condition that "there is little difference between the location $m_k$ of the salient point appointed to the main part of the FIU 2 and the position $v^k$ of vertex of the representative expression image." Consequently, the REU creating engine 137 guides subsequent procedures, i.e., the REU acquisition, the SEU acquisition, and EDU acquisition, to progress more rapidly while minimizing deformation of the source character images (the source character representative expression image, and the source character standard expression image).

$$V_k = m_k \quad \text{[Math Figure 1]}$$

where, $m^k$ is a position of $k^{th}$ salient point appointed to the main part of the FIU, and $v_k$ is a position of $k^{th}$ vertex constituting a polygon mesh of the source character representative expression image.

When "a difference degree between a position $m_k$ of the salient point appointed to the main part of the FIU 2 and a position $v_k$ of vertex constituting a polygon mesh of the representative expression image 1" is acquired through the above procedure, the REU creating engine 137 calculates Math FIG. 2 below based on the difference degree to obtain a summation of respective items, thereby progressing a process of estimating positions of vertexes, $V_I$ for example, that will constitute a polygon mesh PN of the REU 3.

At this time, the positions of vertexes, $V_I$ for example, that will constitute a polygon mesh PN of the REU 3 are estimated through a least square method as shown Math FIG. 2. Therefore, in the invention, the vertexes, $V_I$ for example, constituting the polygon mesh PS of the source character representative expression image 1 exhibits, within a minimum deformation range, a transition pattern that becomes optimally similar to features of the vertexes constituting a polygon mesh PT of the FIU 2 (i.e., a feature error of the two vertexes is minimized). As a result, in "a process of converting the positions $v_i$ of the vertexes constituting the polygon mesh PS of the source character representative expression image 1 into the positions $V_I$ of vertexes that will constitute a polygon mesh PN of the REU 3", which will be progressed later, the source character representative expression image 1 can be eventually changed into the REU 3 having optimally reflected the feature of the FIU 2 401, while minimizing the deformation of the source character representative expression image 1.

$$\underset{V_1, V_2, \ldots, V_I, \ldots}{\operatorname{argmin}} w_s \sum_{i=1}^{|T|} \sum_{j \in adj(i)} \|T_i - T_j\|_F^2 + \quad \text{[Math Figure 2]}$$

$$w_m \sum_{i=1}^{|T|} \|T_i - I\|_F^2 + w_d \sum_{i=1}^{N} \|v_i - c_i\|^2$$

where, $V_I$ is a position of $I^{th}$ vertex that will constitute a polygon mesh of the REU, $T_i$ is a transform matrix of $i^{th}$ triangle constituting a polygon mesh of the source character representative expression image, $T_j$ is a transform matrix of $j^{th}$ triangle neighboring to $T_i$, I is an ideal transform matrix that is almost same as $T_i$, $v_i$ is a position of $i^{th}$ vertex constituting a polygon mesh of the source character representative expression image, $c_i$ is a position of $i^{th}$ vertex constituting a polygon mesh of the FIU as the nearest corresponding position to $v_i$, and matrix norm $\|\ \|_F$ is a Frobenius norm.

At this time, the item $$\operatorname{min} w_s \sum_{i=1}^{|T|} \sum_{j \in adj(i)} \|T_i - T_j\|_F^2$$

included in Math FIG. 2 is an item that estimates a $V_I$ value so that the transform matrix $T_i$ of $i^{th}$ triangle P1 constituting a polygon mesh PS of the source character representative expression image 1 can be transformed while having an uttermost similar value to the transform matrix $T_j$ of $j^{th}$ triangle P2 neighboring to $T_i$, in a situation that $v_i$ is converted into $V_I$ to fully form the polygon mesh PN of the REU 3 (refer to FIG. 10). Needless to say, when $V_I$ is finally estimated by the calculation of Math FIG. 2 including "an adjusting item that minimizes a transform matrix difference between the neighborhoods of the polygon meshes of the source character" and $v_i$ is transformed into $V_I$ to constitute the polygon mesh PN of the REU 3, the REU 3 can maintain an optimized, very smooth shape due to an increase in a similarity of the polygon meshes neighboring to each other.

In addition, the item $$\operatorname{min} w_m \sum_{i=1}^{|T|} \|T_i - I\|_F^2$$

included in Math FIG. 2 is an item that estimates a $V_I$ value so that the transform matrix $T_i$ of $i^{th}$ triangle P1 constituting a polygon mesh PN of the source character representative expression image 1 can be transformed while having an uttermost close value to the ideal transform matrix I that is almost same as $T_i$, in a situation that $v_i$ is converted into $V_I$ to fully form the polygon mesh PN of the REU 3 (refer to FIG. 10). Needless to say, when $V_I$ is finally estimated by the calculation of Math FIG. 2 including "an adjusting item that minimizes a deformed degree of the polygon meshes PS of a source character" and $v_i$ is transformed into $V_I$ to constitute the polygon meshes PN of the REU 3, the vertexes constituting the polygon mesh PS of the source character representative expression image 1 can naturally form the REU 3 having optimally reflected the feature of the FIU 2, even within the minimum deformation range.

Furthermore, the item $$\operatorname{min} w_d \sum_{i=1}^{N} \|v_i - c_i\|^2$$

included in Math FIG. 2 is an item that estimates a $V_I$ value so that the position $v_i$ of $i^{th}$ vertex constituting a polygon mesh PS of the source character representative expression image 1 can be transformed while possibly minimizing a difference with the position $c_i$ of the $i^{th}$ vertex constituting a polygon mesh PT of the FIU 2 and nearest corresponding to $v_i$, in a situation that $v_i$ is converted into $V_I$ to form the polygon mesh PN of the REU 3 in earnest (refer to FIG. 10). Needless to say, when $V_I$ is finally estimated by the calculation of Math FIG. 2 including "an adjusting item that makes the position of vertex of the source character representative expression image as close as possible to the position of vertex of the FIU 2" and $v_i$ is transformed into $V_I$ to constitute the polygon mesh of the REU 3, the REU 3 can naturally form a shape that is closest to the feature of the FIU.

Here, $w_s$, $w_m$, $w_d$ and the like included in each item of Math FIG. 2 are weight factors of the corresponding items. The REU creating engine 137 differently sets the weight factors of the respective items depending on conditions (for example, sets $w_s$: 0.01, $w_m$: 0.1 and $w_d$: 0.2) in the calculation situation of Math FIG. 2, thereby enabling the REU 3, which will be finally completed, to have a shape matching with the FIU 2 more efficiently.

When the REU 3 is created through the procedures described above, the REU creating control section 131 communicates with the DCU production control module 110 by the medium of the information exchange section 132, to guide the REU 3 to be stably stored and managed in the processing buffer 112 of the DCU production control module 110.

In the meantime, the SEU creating module 140, which is controlled by the DCU production control module 110 similarly to the FIU acquisition module 120 and the REU creating module 130, communicates with the REU creating module 130, the source character standard expression image storage section 151 and the like after the REU creating module 130 stores the REU 3 in the processing buffer of the DCU production control module 110 and converts the source character standard expression images (refer to FIG. 3) based on the transform features between the source character representative expression image 1 and the REU 3, to thereby create plural SEUs as shown in FIG. 11.

At this time, as shown in FIG. 12, the SEU creating module 140 is constituted by an SEU creating control section 141 that is in charge of overall control of the SEU creating procedure, and other constituents that operate under the control of the SEU creating control section 141, i.e., an REU conversion characteristic acquisition section 143, a source character standard expression image loading section 144, and an SEU creating engine, each being closely combined with one another.

Here, the REU conversion characteristic acquisition section 143 communicates, under the control of the SEU creating control section 141, with the REU creating module 130, the processing buffer 112 on the side of the DCU production control module 110, etc., via the information exchange section 142 after the REU creating module 130 completes the creation of the REU 3, to acquire position conversion characteristics (e.g., position conversion characteristics when $v_i$ is transformed into $V_I$ to constitute the polygon mesh PN of the REU 3) when the source character's representative expression image 2 is converted into the REU 3. The acquisition result data is loaded and stored into the processing buffer 145 by the REU conversion characteristic acquisition section 143.

In addition, the source character standard expression image loading section 144 communicates, under the control of the SEU creating control section 141, with the source character standard expression image storage section 151 by the medium of the information exchange section 142 after the REU conversion characteristic acquisition section 143 completes loading of the position conversion characteristic data into the processing buffer 145, to extract source character standard expression images (refer to FIG. 3) having been stored therein. These extracted source character standard expression images are loaded into the processing buffer 145 by the source character standard expression image loading section 144 (of course, the performance of the source character standard expression image loading section may precede the performance of the REU conversion characteristic acquisition section).

Upon the completion of the procedures in respective computation parts, the SEU creating engine 146, which is controlled by the REU creating control section 141, communicates with the processing buffer 145 to figure out, as shown in FIG. 13, vertexes that constitute the polygon mesh PS of the source character representative expression image 1, e.g., position conversion characteristics when $V_i$ is transformed into vertexes, $V_I$ for example, to constitute the polygon mesh PN of the REU 3, and converts the positions of the vertexes, $v_n$ for example, that constitute the polygon mesh PS of respective source character standard expression images 4 into $V_N$ for example, to constitute a new polygon mesh PNN. In result, plural SEU 5 maintaining the same expressions (images including a crying face, an angry face, an astonished face, a laughing face, an image having a mouth shape in pronouncing a given phonetic symbol and so on) as the source character standard expression images 4 while keeping the basic facial features of the REU 3 (refer to FIG. 11).

Needless to say, under such a system of the invention, because the SEU creating engine 146 progresses the creation procedure of plural SEUs 5 while having figured out "the position conversion characteristics when the source character representative expression image 1 is converted into the REU 3" in advance, the processing speed of the creation of plural SEUs 5 can be accelerated to an optimal state.

When the creation of plural SEUs 5 is completed through the procedure described above, the SEU creating control section 141 communicates with the DCU production control module 110 by the medium of the information exchange section 142, to guide a corresponding SEU to stably store and manage the SEUs 5 into the processing buffer 112 of the DCU production control module.

Meanwhile, when the performance of the SEU creating module 140 is completed, the EDU creating module 170 communicates, under the control of the DCU production control module 110, with the SEU creating module 140, the source pictorial/video image setting information storage section 154 and the like to selectively combine/transform the SEU 5, on the basis of the conversion features exhibiting when a proximate expression image that is most proximate to each reproduced expression pictorial/video image of the source character (refer to FIG. 4) among the standard expression images of the source character is converted into each reproduced expression image, to thereby create an EDU similar to one shown in FIG. 14.

At this time, as shown in FIG. 15, the EDU creating module is constituted by an EDU creating control section 171 that is in charge of overall control of the EDU creating procedure, and other constituents that operate under the control of the EDU creating control section 171, i.e., an SEU loading section 174, a source character expression pictorial/video image creating characteristic acquisition section 173, and an EDU creating engine 176, each being closely combined with one another.

Here, the SEU loading section 174, which is controlled by the EDU creating control section 171, communicates via the information exchange section 172 with the processing buffer 112 of the DCU production control module 110 where SEUs 5 had been stored by the SEU creating module 140, so as to extract corresponding SEUs 5, and loads the extracted SEUs 5 into the processing buffer 175.

In addition, the source character expression pictorial/video image creating characteristic acquisition section 173, which is controlled by the EDU creating control section 171, communicates with the source pictorial/video image setting information storage section 154 by the medium of the information exchange section 172 after the SEU loading section completes loading of the SEUs 5 into the processing buffer 175, to check information having been stored therein, i.e., (as shown in FIG. 16) information about which proximate expression image 4a, 4b, and 4c among the standard expression images 4 of the source character is most proximate to each reproduced expression image 6, 6a, 6b, and 6c: refer to FIG. 4 when a specific source character appearing in the source pictorial/video image contents is reproduced while making changes in facial expressions as time passes. Moreover, the source character expression pictorial/video image creating characteristic acquisition section 173 acquires "mixture weight features when proximate expression images 4a, 4b, and 4c are mixed with other standard expression images 4 to transform the reproduced expression pictorial/video images 6a, 6b, and 6c every moment (of course, the performance of the source character expression pictorial/video image creating characteristic acquisition section may precede the performance of the SEU loading section).

Upon the completion of the procedures in respective computation parts, the EDU creating engine 176, which is controlled by the EDU creating control section 171, estimates proximate SEUs 5a, 5b, and 5c that are most proximate to the EDUs 7, 7a, 7b, and 7c among the SEUs 5, when it is assumed, as shown in FIG. 17, a user design character appearing in the DCU is reproduced with changes in facial expressions as time passes, on the basis of the information on the proximate expression images 4a, 4b, and 4c having been acquired by the source character expression pictorial/video image creating characteristic acquisition section 173. Moreover, the EDU creating engine 176 calculates Math FIG. 3 below, according to mixture weight features, and combines proximate SEUs 5a, 5b, and 5c with other SEUs 5 every minute and creates EDU 7 depending on the reproduction time of the DCU (refer to FIG. 14).

$$F(t) = \sum_i w_i(t) M_i$$ [Math Figure 3]

where, F(t) is an EDU varying by reproduction time flow of DCU, $w_i(t)$ is a function of mixture weights with respect to time, and $M_i$ is an $i^{th}$ proximate SEU.

In computation of Math FIG. 3 aforementioned, the EDU creating engine 171 can accelerate the processing speed of the creation of the EDU 7 to an optimal state because SEUs 5 obtained based on the standard expression image 4 of the source character is utilized as a basis of the EDU formation and "the mixture weight features at the time the proximate expression images 4a, 4b, and 4c are mixed with other standard expression images 4 for conversion of the reproduced expression pictorial/video images 6 every moment" are completely employed and taken advantage of as the mixture weight features for the formation of EDU 7.

When the EDU 7 is created through the above procedure, the EDU creating control section 171 communicates with the DCU production control module 110 via the information exchange section 172, to guide the corresponding EDU 7 to be stored and managed in the processing buffer 112 of the DCU production control module 110 in a stable manner.

In the meantime, when the EDU creating module 170 completes the EDU creating and storage, the DCU creating module 160 communicates, under the DCU production control module 110, with the source pictorial/video image background content storage section 153 and combines the EDU 7 with the background of the source pictorial/video image content, to create a DCU having the facial image of the source character being changed to the FIU 2 as shown in FIG. 18.

At this time, as shown in FIG. 19, the DCU creating module 160 is constituted by a DCU creating control section 161 that is in charge of overall control of the DCU creating procedure, and other constituents that operate under the control of the DCU creating control section 161, i.e., a background content loading section 163, an EDU loading section 164, and a DCU creating engine 166, each being closely combined with one another.

Here, the background content loading section 163 communicates, under the control of the DCU creating control section 161, with the source pictorial/video image background content storage section 153 by the medium of the information exchange section 162 after the EDU creating module 170 stores the EDU 7 in the processing buffer 112 of the DCU production control module 110, and extracts the background of the source pictorial/video image content having been stored (e.g., background pictorial/video image layer, source character body pictorial/video image layer, other source character layer, source character accessories/clothes layer, etc.). The background content loading section 163 loads the extracted background data into the processing buffer 165.

In addition, the EDU loading section 164 communicates, under the DCU creating control section 161, with the processing buffer 112 of the DCU production control module 110 by the medium of the information exchange section 162 after the EDU creating module 170 stores the EDU 7 in the processing buffer 112, to extract the corresponding EDU 7. The EDU loading section 164 loads the extracted EDU 7 into the processing buffer 165 (of course, the performance of the EDU loading section may precede the performance of the background content loading section).

Upon the completion of the procedures in respective computation parts described earlier, the DCU creating engine 166 communicates, under the control of the DCU creating control section 161, with the processing buffer 165 and synthesizes the EDU 7 with a source character face image f of the background data B1, B2, and B3, according to the reproduction flow of the source pictorial/video image contents as shown in FIG. 20. In result of the synthesis, a DCU 8 having the source character face image f being newly replaced into the FIU 2 pattern is created (refer to FIG. 18).

When the DCU 8 is created through the procedure described above, the DCU creating control section 161 communicates with the DCU production control module 110 by the medium of the information exchange section 162, to guide the corresponding DCU 8 to be stably stored and managed in the processing buffer 112 of the DCU production control module.

Accordingly, when the DCU 8 having the source character face image being newly replaced into the FIU 2 pattern is secured through the pictorial/video image composing pipe line, a video related company (for example, a producer, a distributor, a sales agency (provider), etc.) become capable of production/manufacture/marketing a video on demand (VOD) content that reflects individual desire of a user so that they can satisfy user needs in changing the face image of a specific character appearing in pictorial/video image contents into the face image of his/her favorite person (or the user designates, for example, his/her own face image, the face image of his/her acquaintance, the face image of a specific celebrity, the face image of a specific politician, and so on).

While the invention has been shown and described with reference to certain preferred embodiments thereof, it will be understood by those skilled in the art that various changes in form and details may be made thereto without departing from the spirit and scope of the invention as defined by the appended claims.

INDUSTRIAL APPLICABILITY

The invention relates to a system for composing pictorial/video image contents where the FIU is reflected, and more particularly, to a system for composing pictorial/video image contents reflecting the FIU, in which the system provides a series of pictorial/video image composing pipe line capable of changing the face of a specific source character that appears in pictorial/video image contents to a FIU pattern and guides a video related company (for example, a producer, a distributor, a sales agency (provider), etc.) to be able to establish a base infra for producing/manufacturing/marketing a video on demand (VOD) content that reflects individual desire of a user so that it can satisfy user needs in changing the face image of a specific character appearing in pictorial/video image contents into the face image of his/her favorite person (or the user designates, for example, his/her own face image, the face image of his/her acquaintance, the face image of a specific celebrity, the face image of a specific politician, and so on).

The invention claimed is:

1. A system for composing a pictorial/video image content where FIU (face image which the user designates) is reflected, comprising:
   an input/output device;
   a DCU (pictorial/viDeo image Contents where the FIU is reflected) production control module installed in an information processing device having an operation system for storing and managing information related to a source pictorial/video image content, for outputting and operating a production guide window, and for performing an overall control over changing a face of a specific source character appearing in the source pictorial/video image content to an FIU pattern;
   an REU creating module for converting, under the control of the DCU production control module, a representative expression image of a specific source character appearing in the source pictorial/video image content into one matching with the FIU, to create an REU (Representative Expression image for User design character);
   an SEU creating module for converting, under the control of the DCU production control module, standard expression images of the source character based on conversion features between a representative expression image of the source character and the REU, to create plural SEUs (Standard Expression images for User design character);
   an EDU creating module for selectively combining and transforming the SEUs, under the DCU production control module, based on conversion features exhibiting when a proximate expression image that is most proximate to each reproduced expression pictorial/video image of the source character among standard expression images of the source character is converted into each reproduced expression image, to create an EDU (Expression pictorial/viDeo image for User design character); and
   a DCU creating module for creating, under the control of the DCU production control module, a DCU having a face image of the source character being newly replaced into the FIU pattern by combining the EDU with a background of the source pictorial/video image content, wherein the REU creating module comprises:
   an REU creating control section for performing an overall control of an REU creating procedure;
   an FIU loading section for loading the FIU, under the control of the REU creating control section;
   a salient point designation guide section for displaying, under the control of the REU creating control section, the FIU having been loaded by the FIU loading section through the production guide window, to designate a salient point at a main part of the FIU; and
   an REU creating engine for estimating, under the control of the REU creating control section, positions of vertexes that constitute a polygon mesh of the REU on the basis of a difference degree between a position of a salient point designated at the main part of the FIU and a position of a vertex that constitutes a polygon mesh of the source character representative expression image, and for converting the positions of the vertexes constituting the polygon mesh of the source character representative expression image into positions of the vertexes constituting the polygon mesh of the REU, thereby creating a REU matched to the FIU.

2. The system according to claim 1, wherein the REU creating engine calculates a following equation to estimate the positions of the vertexes that constitute the polygon mesh of the REU, $$\operatorname*{argmin}_{V_1, V_2, \ldots, V_l, \ldots} w_s \sum_{i=1}^{|T|} \sum_{j \in adj(i)} \|T_i - T_j\|_F^2 + w_m \sum_{i=1}^{|T|} \|T_i - I\|_F^2 + w_d \sum_{i=1}^{N} \|v_i - c_i\|^2$$

where, $V_l$ is a position of $l^{th}$ vertex that will constitute a polygon mesh of the REU, $T_i$ is a transform matrix of $i^{th}$ triangle constituting a polygon mesh of the source character representative expression image, $T_j$ is a transform matrix of $j^{th}$ triangle neighboring to $T_i$, 1 is an ideal transform matrix that is almost same as $T_i$, $v_i$ is a position of $i^{th}$ vertex constituting a polygon mesh of the source character representative expression image, $c_i$ is a position of $i^{th}$ vertex constituting a polygon mesh of the user face image while nearest corresponding to and $\| \|_F$ is a Frobenius norm.

3. A system for composing a pictorial/video image content where FIU (face image which the user designates) is reflected, comprising:
   an input/output device;
   a DCU (pictorial/viDeo image Contents where the FIU is reflected) production control module installed in an information processing device having an operation system for storing and managing information related to a source pictorial/video image content, for outputting and operating a production guide window, and for performing an overall control over changing a face of a specific source character appearing in the source pictorial/video image content to an FIU pattern;
   an REU creating module for converting, under the control of the DCU production control module, a representative expression image of a specific source character appearing in the source pictorial/video image content into one matching with the FIU, to create an REU (Representative Expression image for User design character);
   an SEU creating module for converting, under the control of the DCU production control module, standard expression images of the source character based on conversion features between a representative expression image of the source character and the REU, to create plural SEUs (Standard Expression images for User design character);

an EDU creating module for selectively combining and transforming the SEUs, under the DCU production control module, based on conversion features exhibiting when a proximate expression image that is most proximate to each reproduced expression pictorial/video image of the source character among standard expression images of the source character is converted into each reproduced expression image, to create an EDU (Expression pictorial/viDeo image for User design character); and a DCU creating module for creating, under the control of the DCU production control module, a DCU having a face image of the source character being newly replaced into the FIU pattern by combining the EDU with a background of the source pictorial/video image content, wherein the SEU creating module comprises:

an SEU creating control section for performing an overall control of an SEU creating procedure;

an REU conversion characteristic acquisition section for acquiring, under the control of the SEU creating control section, position conversion characteristics exhibiting when the representative expression image of the source character is converted into the REU;

a source character standard expression image loading section for loading, under the control of the SEU creating control section, the standard expression images of the source character; and an SEU creating engine for converting, under the control of the SEU creating control section, positions of vertexes that constitute a polygon mesh of the standard expression images of the source character to be same as position conversion characteristics exhibiting when vertexes that constitute a polygon mesh of the representative expression image are converted into vertexes that constitute a polygon mesh of the REU, to create plural SEUs having the same expressions with the standard expression images of the source character while maintaining basic features of the REU.

4. A system for composing a pictorial/video image content where FIU (face image which the user designates) is reflected, comprising:

an input/output device;

a DCU (pictorial/viDeo image Contents where the FIU is reflected) production control module installed in an information processing device having an operation system for storing and managing information related to a source pictorial/video image content, for outputting and operating a production guide window, and for performing an overall control over changing a face of a specific source character appearing in the source pictorial/video image content to an FIU pattern;

an REU creating module for converting, under the control of the DCU production control module, a representative expression image of a specific source character appearing in the source pictorial/video image content into one matching with the FIU, to create an REU (Representative Expression image for User design character);

an SEU creating module for converting, under the control of the DCU production control module, standard expression images of the source character based on conversion features between a representative expression image of the source character and the REU, to create plural SEUs (Standard Expression images for User design character);

an EDU creating module for selectively combining and transforming the SEUs, under the DCU production control module, based on conversion features exhibiting when a proximate expression image that is most proximate to each reproduced expression pictorial/video image of the source character among standard expression images of the source character is converted into each reproduced expression image, to create an EDU (Expression pictorial/viDeo image for User design character); and a DCU creating module for creating, under the control of the DCU production control module, a DCU having a face image of the source character being newly replaced into the FIU pattern by combining the EDU with a background of the source pictorial/video image content, wherein the EDU creating module comprises:

an EDU creating control section for performing an overall control of an EDU creating procedure;

a source character expression pictorial/video image creating characteristic acquisition section for checking, under the control of the EDU creating control section, a proximate expression image that is most proximate to each reproduced expression image among the standard expression images of the source character when a specific source character appearing in the source pictorial/video image content is reproduced while making changes in facial expressions as time passes, and for acquiring a mixture weight feature exhibiting when the proximate expression image is mixed with other standard expression images to transform the reproduced expression pictorial/video image every moment; and an EDU creating engine for estimating, under the control of the EDU creating control section, a proximate SEU that is most proximate to the EDU among the SEUs when it is assumed that a user design character appearing in the DCU is reproduced with changes in facial expressions as time passes, on the basis of the information on the proximate expression image having been acquired by the source character expression pictorial/video image creating characteristic acquisition section and for mixing the proximate SEU with other SEUs every moment conforming to the mixture weight feature, to create an EDU according to reproduction time of the DCU.

5. The system according to claim 4, wherein the EDU creating engine calculates a following equation to create an EDU according to reproduction time of the DCU, $$F(t) = \sum_i w_i(t) M_i$$

where, F(t) is an EDU varying by reproduction time flow of DCU, $w_i(t)$ is a function of mixture weights with respect to time, and $M_i$ is an $i^{th}$ proximate SEU.

* * * * *